US009577455B2

(12) United States Patent
Li

(10) Patent No.: US 9,577,455 B2
(45) Date of Patent: Feb. 21, 2017

(54) HIGH POWER CHARGING DEVICE

(71) Applicant: HON HAI PRECISION INDUSTRY CO., LTD., New Taipei (TW)

(72) Inventor: Tsung-Yen Li, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 198 days.

(21) Appl. No.: 14/476,489

(22) Filed: Sep. 3, 2014

(65) Prior Publication Data

US 2015/0280475 A1 Oct. 1, 2015

(30) Foreign Application Priority Data

Mar. 25, 2014 (TW) .............................. 103111089 A

(51) Int. Cl.
*H02J 7/00* (2006.01)
*H02J 7/04* (2006.01)
*G06F 13/36* (2006.01)
*G06F 13/40* (2006.01)

(52) U.S. Cl.
CPC ......... *H02J 7/0052* (2013.01); *G06F 13/4059* (2013.01); *H02J 2007/0062* (2013.01)

(58) Field of Classification Search
CPC ............ H02J 7/04; H02J 7/0052; G06F 13/18; G06F 13/38; G06F 13/42; G06F 13/4059; H01M 10/44
USPC .................................. 320/107, 162; 710/310
See application file for complete search history.

(56) References Cited

U.S. PATENT DOCUMENTS

| 6,133,766 | A | 10/2000 | Pulvirenti et al. | |
|---|---|---|---|---|
| 6,462,511 | B1 * | 10/2002 | Kwok ................... | H02J 7/0024 320/119 |
| 7,424,314 | B2 * | 9/2008 | Park ....................... | H04M 1/17 379/452 |
| 7,479,762 | B2 * | 1/2009 | Bayne ...................... | G06F 1/26 320/132 |
| 8,028,178 | B2 * | 9/2011 | Gk .......................... | G06F 1/266 713/310 |
| 8,179,087 | B2 * | 5/2012 | Neumiller ............ | A61N 1/3931 320/106 |
| 8,760,123 | B2 * | 6/2014 | Hawawini ............. | H02J 7/0004 320/137 |

(Continued)

FOREIGN PATENT DOCUMENTS

| CN | 1881738 | 12/2006 |
|---|---|---|
| CN | 1885676 | 12/2006 |

(Continued)

*Primary Examiner* — M'Baye Diao
(74) *Attorney, Agent, or Firm* — Zhigang Ma

(57) ABSTRACT

A charging device switchable between a first charging current and a second charging current includes a USB port and an identification signal providing circuit. The identification signal providing circuit outputs an identification signal to the electronic device when the electronic device is first coupled to the USB port. The electronic device determines whether the charging device matches the electronic device or not according to the identification signal. The electronic device is recharged using the first charging current when the charging device does match the electronic device, and the electronic device is recharged using the second charging current when the charging device does not match the electronic device.

9 Claims, 2 Drawing Sheets

(56) References Cited

U.S. PATENT DOCUMENTS

| | | | | |
|---|---|---|---|---|
| 8,914,555 B2* | 12/2014 | Mullins | ............ | G06F 21/44 |
| | | | | 320/114 |
| 9,030,155 B1* | 5/2015 | Li | ............ | H02J 7/0003 |
| | | | | 320/107 |
| 9,065,489 B2* | 6/2015 | Mach | ............ | H02J 5/00 |
| 9,146,888 B2* | 9/2015 | Terlizzi | ............ | G06F 13/38 |
| 9,289,039 B2* | 3/2016 | Akin | ............ | A45B 25/00 |
| 2005/0001590 A1* | 1/2005 | Bayne | ............ | H02J 7/0027 |
| | | | | 320/128 |
| 2007/0188134 A1* | 8/2007 | Hussain | ............ | H01M 10/44 |
| | | | | 320/114 |
| 2007/0278992 A1* | 12/2007 | Paul | ............ | H01M 2/34 |
| | | | | 320/107 |
| 2010/0201308 A1* | 8/2010 | Lindholm | ............ | G06F 1/26 |
| | | | | 320/107 |
| 2014/0070774 A1* | 3/2014 | Terlizzi | ............ | H02J 7/0004 |
| | | | | 320/162 |
| 2014/0223037 A1* | 8/2014 | Minoo | ............ | G06F 1/1632 |
| | | | | 710/16 |
| 2015/0188346 A1* | 7/2015 | Oku | ............ | H02J 7/0029 |
| | | | | 320/107 |

FOREIGN PATENT DOCUMENTS

| | | |
|---|---|---|
| CN | 1967965 | 5/2010 |
| CN | 102055223 A | 5/2011 |
| CN | 102299532 A | 12/2011 |
| CN | 102388520 A | 3/2012 |
| TW | 201235857 | 9/2012 |
| TW | 201306431 | 2/2013 |
| TW | 201330356 | 7/2013 |

* cited by examiner

HIGH POWER CHARGING DEVICE

FIELD

The disclosure relates to rechargeable batteries, and particularly to a rechargeable battery that is charged via a USB cable.

BACKGROUND

A small handheld device (for example a mobile phone) can be connected to a host device (for example a notebook computer) via a USB cable, and the small handheld device is charged using a maximum current of 500 milliamps. It is challenging to make a host device that can supply more than 500 mA charging current via a USB cable.

BRIEF DESCRIPTION OF THE DRAWINGS

Implementations of the present technology will now be described, by way of example only, with reference to the attached figures.

DETAILED DESCRIPTION

Figure 1:
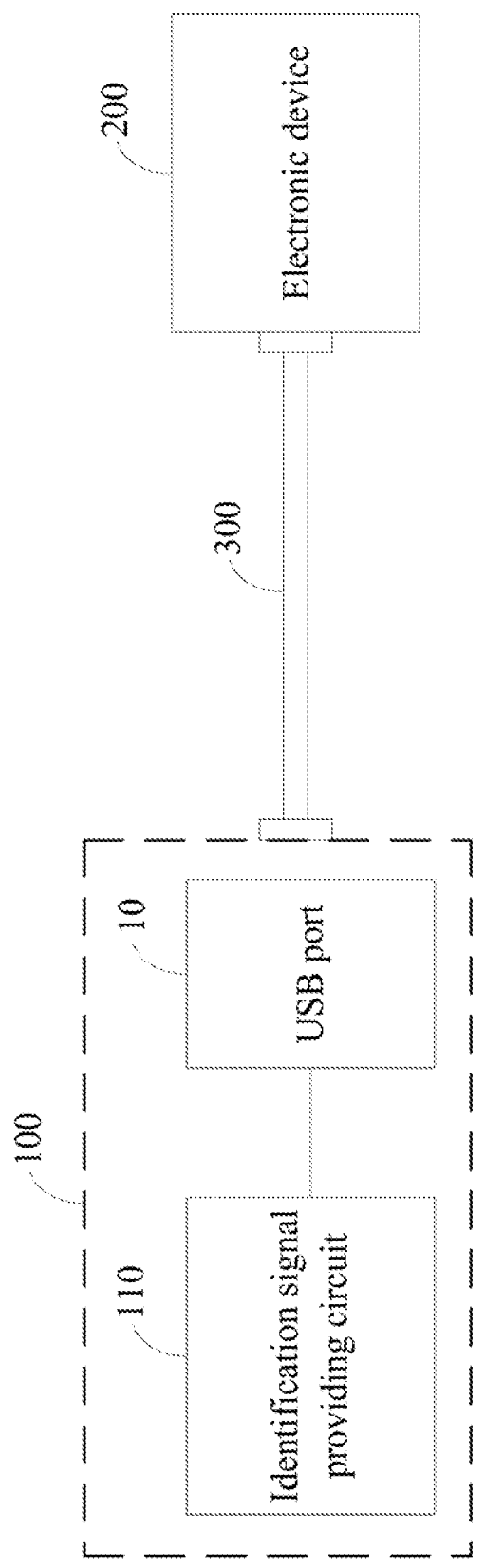
FIG. 1 is a diagrammatic view of a first embodiment of a charging device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation a charging device.

FIG. 1 illustrates a charging device 100. In at least one embodiment, the charging device 100 charges an electronic device 200 via a universal serial bus (USB) cable 300. The charging device 100 comprises a USB port 10 and an identification signal providing circuit 110. The identification signal providing circuit 110 outputs an identification signal to the electronic device 200 in response to the electronic device 200 being coupled to the USB port 10, and the electronic device 200 determines whether the charging device 100 is matched to the electronic device 200 or not according to the identification signal. When the charging device 100 is matched to the electronic device 200, the charging device 100 charges the electronic device 200 using a first charging current. When the charging device 100 is not matched to the electronic device 200, the charging device 100 charges the electronic device 200 using a second charging current.

In at least one embodiment, a value of the first charging current is greater than a value of the second charging current. The value of the first charging current can be 1 A or 2 A, and the value of the second charging current can be 0.5 A. The charging device 100 can be a tablet personal computer, a notebook computer, a personal computer, or other host devices. The electronic device 200 can be a mobile phone, a music player, a BLUETOOTH® earpiece, or other devices.

Figure 2:
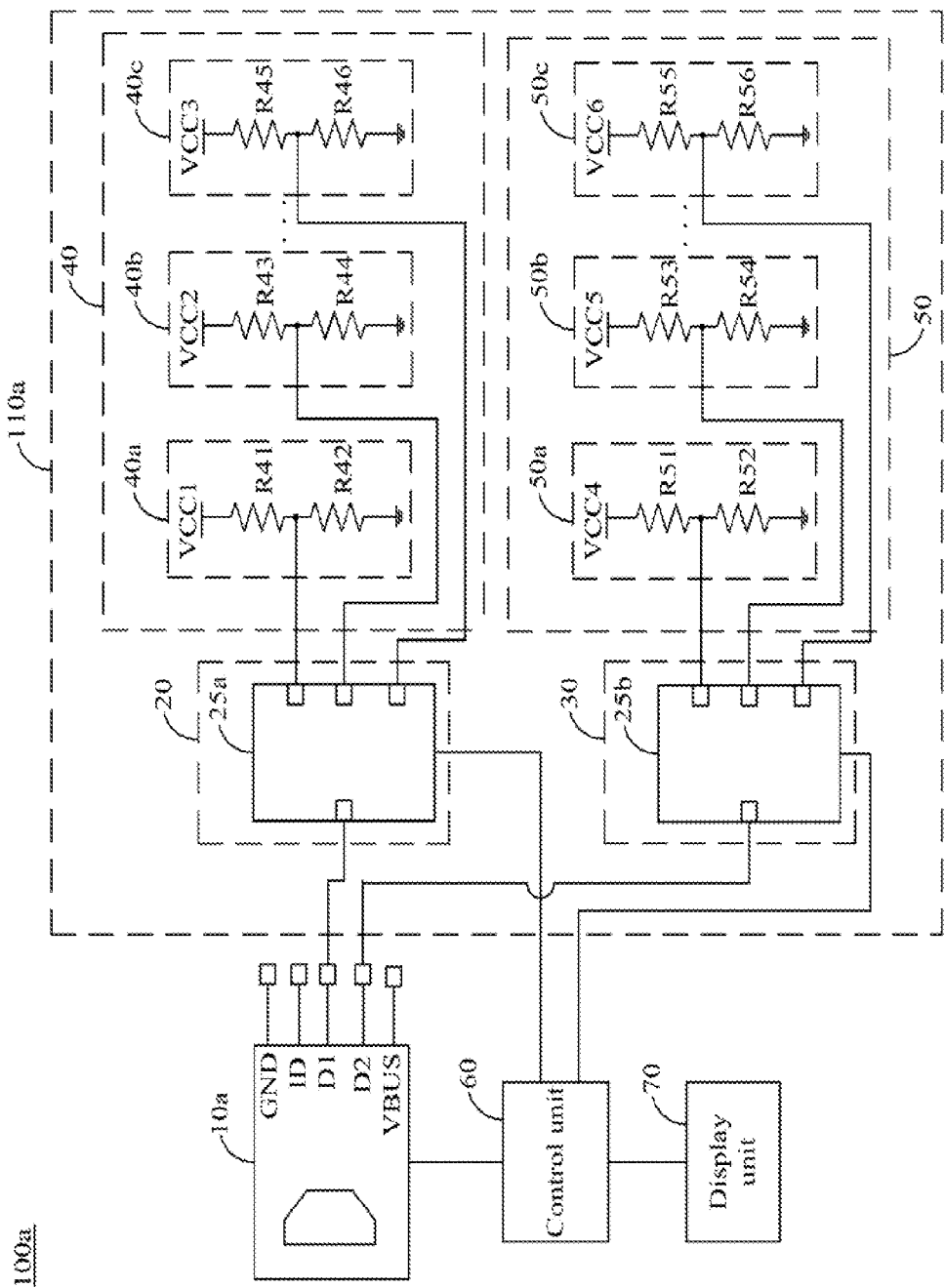
FIG. 2 is a circuit diagram of a second embodiment of a charging device.

FIG. 2 illustrates a circuit diagram of a charging device 100a. In at least one embodiment, the charging device 100a comprises a USB port 10a and an identification signal providing circuit 110a. The identification signal providing circuit 110a comprises a first switch 20, a second switch 30, a first voltage dividing circuit 40, and a second voltage dividing circuit 50.

The USB port 10a comprises a first data pin D1, a second data pin D2, a ground pin GND, and a power pin VBUS. The first switch 20 is coupled to the first data pin D1 and the first voltage dividing circuit 40, and the second switch 30 is coupled to the second data pin D2 and the second voltage dividing circuit 50. The identification signal providing circuit 100a outputs the identification signal to the electronic device 200 in response to the electronic device 200 being coupled to the USB port 10a.

The first voltage dividing circuit 40 comprises one or more first voltage dividing units 40a, 40b, 40c (three shown as a non-limiting example) to output a first voltage. The first switch 20 controls the first data pin D1 coupled to one of the first voltage dividing units 40a, 40b, 40c so that the first voltage dividing circuit 40 can supply a first voltage to the first data pin D1. The second voltage dividing circuit 50 comprises one or more second voltage dividing units 50a, 50b, 50c (three shown as a non-limiting example) to output a second voltage. The second switch 30 controls the second data pin D2 coupled to one of the second voltage dividing units 50a, 50b, 50c so that the second voltage dividing circuit 50 can supply a second voltage to the second data pin D2.

In at least one embodiment, the identification signal comprises the first voltage and the second voltage. The identification signal providing circuit 110a outputs the first voltage and the second voltage to the electronic device 200 via the first data pin D1 and the second data pin D2 respectively. The electronic device 200 determines whether the charging device 100a is matched to the electronic device 200 or not according to the first voltage and the second voltage.

In at least one embodiment, when the charging device 100a can identify a type of the electronic device 200, the charging device 100a is matched to the electronic device 200.

Each of the first voltage dividing units 40a, 40b, 40c comprises two resistors in series, and each of the second voltage dividing units 50a, 50b, 50c comprises two resistors in series.

In at least one embodiment, the first voltage dividing unit 40a comprises a first resistor R41 and a second resistor R42. A first end of the first resistor R41 is coupled to a first power source VCC1, a second end of the first resistor R41 is coupled to a first end of the second resistor R42, and a second end of the second resistor R42 is grounded. The first voltage dividing unit 40b comprises a third resistor R43 and a fourth resistor R44. A first end of the third resistor R43 is coupled to a second power source VCC2, a second end of the third resistor R43 is coupled to a first end of the fourth resistor R44, and a second end of the fourth resistor R44 is grounded.

The first voltage dividing unit 40c comprises a fifth resistor R45 and a sixth resistor R46. A first end of the fifth resistor R45 is coupled to a third power source VCC3, a second end of the fifth resistor R45 is coupled to a first end of the sixth resistor R46, and a second end of the sixth resistor R46 is grounded. The second voltage dividing unit 50a comprises a seventh resistor R51 and an eighth resistor R52. A first end of the seventh resistor R51 is coupled to a fourth power source VCC4, a second end of the seventh resistor R51 is coupled to a first end of the eighth resistor R52, and a second end of the eighth resistor R52 is grounded.

The second voltage dividing unit 50b comprises a ninth resistor R53 and a tenth resistor R54. A first end of the ninth resistor R5 is coupled to a fifth power source VCC5, a second end of the ninth resistor R53 is coupled to a first end of the tenth resistor R54, and a second end of the tenth resistor R54 is grounded. The second voltage dividing unit 50c comprises an eleventh resistor R55 and a twelfth resistor R56. A first end of the eleventh resistor R55 is coupled to a sixth power source VCC6, a second end of the eleventh resistor R55 is coupled to a first end of the twelfth resistor R56, and a second end of the twelfth resistor R56 is grounded.

Resistance values of the first resistor R41, the second resistor R42, the third resistor R43, the fourth resistor R44, the fifth resistor R45, the sixth resistor R46, the seventh resistor R51, the eighth resistor R52, the ninth resistor R53, the tenth resistor R54, the eleventh resistor R55, and the twelfth resistor R56 are determined by actual circuit design. Values of the power sources VCC1, VCC2, VCC3, VCC4, VCC5, and VCC6 are also determined by actual circuit design.

In at least one embodiment, the values of the first power source VCC1 and the fourth power source VCC4 are both 3.6V, and the values of the power sources VCC2, VCC3, VCC5, and VCC6 are all 5V.

In at least one embodiment, the values of the first power sources VCC1 and the fourth power source VCC4 are determined by a USB communication standard. The first voltage dividing unit 40a and the second voltage dividing unit 50a are further used for making the electronic device 200 which is found to match the charging device 100a communicate with the charging device 100a according to the USB communication standard.

The first switch 20 comprises a multi-way switch 25a, and the second switch 30 comprises a multi-way switch 25b. The multi-way switches 25a, 25b both comprise an input terminal and a plurality of output terminals. Each of nodes between the two resistors of the first voltage dividing units 40a, 40b, 40c is respectively coupled to an output terminal of the multi-way switch 25a. Each of nodes between the two resistors of the second voltage dividing units 50a, 50b, 50c is respectively coupled to an output terminal of the multi-way switch 25b.

In at least one embodiment, the one or more first voltage dividing units are the three first voltage dividing units 40a, 40b, 40c, and the one or more second voltage dividing units are the three second voltage dividing units 50a, 50b, 50c. The multi-way switches 25a and 25b may be three-way switches, or four-way switches. In other embodiments, an eight-way switch can take the place of the first switch 20 and the second switch 30.

When the electronic device 200 is coupled to the USB port 10a to be charged, the identification signal providing circuit 110a outputs the first voltage to the electronic device 200 via the first switch 20, the first data pin D1 of the USB port 10a, and one of the first voltage dividing units 40a, 40b, 40c which is coupled to the first data pin D1. The identification signal providing circuit 110a further outputs the second voltage to the electronic device 200 via the second switch 30, the second data pin D2 of the USB port 10a, and one of the second voltage dividing units 50a, 50b, 50c which is coupled to the second data pin D2.

The electronic device 200 determines whether the charging device 100a is matched to the electronic device 200 or not according to the first voltage and the second voltage. When the charging device 100a is matched to the electronic device 200, the electronic device 200 is charged using the first charging current. When the charging device 100a is not matched to the electronic device 200, the electronic device 200 is charged using the second charging current.

In at least one embodiment, the first voltage dividing units 40a, 40b, 40c can output three instances of the first voltage, and the second voltage dividing units 50a, 50b, 50c can also output three instances of the second voltage so that the charging device 100a can charge three types of electronic devices.

When the electronic device 200 receives the first voltage and the second voltage, the electronic device 200 can identify the charging device 100a as a charger so that the electronic device 200 can be charged in a quick charging mode. When the electronic device 200 can be charged in the quick charging mode, the charging device 100a charges the electronic device 200 using the first charging current.

In at least one embodiment, a value of the first voltage is equivalent to a value of the second voltage. In other embodiments, the value of the first voltage may be not equivalent to the value of the second voltage, and the difference between the value of the first voltage and the value of the second voltage may be less than 1 V.

In at least one embodiment, the charging device 100a further comprises a control unit 60 and a display unit 70. The control unit 60 is coupled to the USB port 10a, the first switch 20, the second switch 30, and the display unit 70. The control unit 60 displays an interface in the display unit 70 to remind a user to select a type of the electronic device 200 from a plurality of predetermined types, and outputs a control signal to the first switch 20 and the second switch 30 according to the type of the electronic device 200 selected by the user. The first switch 20 connects the first data pin D1 to the first voltage dividing unit 40a which corresponds to the type of electronic device 200 selected by the user according to the control signal, and the second switch 30 connects the second data pin D2 to the second voltage dividing unit 50a which corresponds to the type of the electronic device 200 selected by the user according to the control signal.

In at least one embodiment, the charging device 100a provides a plurality of predetermined types of electronic devices available for selection. Each type of electronic device corresponds to each of the first voltage dividing units 40a, 40b, 40c and to each of the second voltage dividing units 50a, 50b, 50c. When the type of the electronic device 200 is a first type as selected by the user, the control unit 60 outputs a first control signal to the first switch 20 and the second switch 30. The first switch 20 connects the first data pin D1 to the first voltage dividing unit 40a according to the first control signal, and the second switch 30 connects the second data pin D2 to the second voltage dividing unit 50a according to the first control signal. The electronic device 200 is charged using the first charging current by reference to the first voltage output by the first voltage dividing unit 40a and the second voltage output by the second voltage dividing unit 50a.

When the type of the electronic device 200 is a second type as selected by the user, the control unit 60 outputs a second control signal to the first switch 20 and the second switch 30. The first switch 20 connects the first data pin D1 to the first voltage dividing unit 40b according to the first control signal, and the second switch 30 connects the second data pin D2 to the second voltage dividing unit 50b according to the second control signal. The electronic device 200 is charged using the first charging current by reference to the first voltage output by the first voltage dividing unit 40b and the second voltage output by the second voltage dividing unit 50b.

In at least one embodiment, the USB port 10a further comprises an identification pin ID1 to identify the type of the electronic device 200 in response to the electronic device 200 being coupled to the USB port 10a. The control unit 60 obtains the type of the electronic device 200 via the identification pin ID1, and outputs the control signal to the first switch 20 and the second switch 30 according to the obtained type of the electronic device 200. Therefore, the first switch 20 can connect the first data pin D1 to the first voltage dividing unit 40a which corresponds to the obtained type of the electronic device 200, and the second switch 30 can connect the second data pin D2 to the second voltage dividing unit 50a which corresponds to the obtained type of the electronic device 200.

In at least one embodiment, the control unit 60 can be a central processing unit (CPU) comprising the charging device 100a, and the control unit 60 can run an application program to achieve identification functions. The display unit 70 can be a touch screen. In other embodiments, the control unit 60 can be a micro control unit (MCU), a programmable logic device (PLD), a complex programmable logic device (CPLD), or a field programmable gate array (FPGA). The user can also use keys to select the type of the electronic device 200.

Many details are often found in the art such as the other features of a shielding plate. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A charging device comprising:
    a universal serial bus (USB) port comprising a first data pin, a second data pin, a ground pin, and a power pin;
    an identification signal providing circuit coupled to the USB port, the identification signal providing circuit configured to output an identification signal to an electronic device that determines whether the charging device is matched to the electronic device or not in response to the electronic device coupled to the USB port;
    wherein the charging device is configured to charge the electronic device using a first charging current in response to the charging device matched to the electronic device, and the charging device is further configured to charge the electronic device using a second charging current in response to the charging device not matched to the electronic device; the identification signal providing circuit comprises:
    a first voltage dividing circuit comprising one or more first voltage dividing units;
    a second voltage dividing circuit comprising one or more second voltage dividing units;
    a first switch coupled between the first data pin and the first voltage dividing circuit, the first switch controlling the first data pin coupled to one of the first voltage dividing units so that the first voltage dividing circuit supplies a first voltage to the first data pin; and
    a second switch coupled between the second data pin and the second voltage dividing circuit, the second switch controlling the second data pin coupled to one of the second voltage dividing units so that the second voltage dividing circuit supplies a second voltage to the second data pin;
    a display unit; and
    a control unit coupled to the USB port, the first switch, the second switch, and the display unit, the control unit displaying an interface in the display unit to remind a user to select a type of the electronic device from a plurality of predetermined types, and outputting a control signal to the first switch and the second switch according to the type of the electronic device selected by the user.

2. The charging device of claim 1, wherein each of the first voltage dividing units comprises:
    a first resistor with a first end coupled to a first power source and a second end coupled to the first switch; and
    a second resistor with a first end coupled to a node between the first resistor and the first switch and a second end grounded;
    each of the second voltage dividing units comprises:
    a third resistor with a first end coupled to a second power source and a second end coupled to the second switch; and
    a fourth resistor with a first end coupled to a node between the third resistor and the second switch and a second end grounded.

3. The charging device of claim 1, wherein the identification signal comprises the first voltage and the second voltage, the identification signal providing circuit outputs the first voltage and the second voltage to the electronic device via the first data pin and the second data pin, and the electronic device determines whether the charging device is matched to the electronic device or not according to the first voltage and the second voltage.

4. The charging device of claim 1, wherein the first switch and the second switch both comprise a multi-way switch which comprises an input terminal and a plurality of output terminals, each of nodes between the first resistor and the second resistor of the first voltage dividing units is respectively coupled to each of the output terminals of the first switch, and each of nodes between the third resistor and the fourth resistor of the second voltage dividing units is respectively coupled to each of the output terminals of the second switch.

5. The charging device of claim 1, wherein the first switch controls the first data pin coupled to one of the first voltage dividing units according to the control signal, and the second switch controls the second data pin coupled to one of the second voltage dividing units according to the control signal.

6. The charging device of claim 5, wherein the display unit comprises a touch screen.

7. The charging device of claim 1, wherein the USB port further comprises an identification pin identifying a type of the electronic device in response to the electronic device coupled to the USB port.

8. The charging device of claim 7, further comprising:
a display unit; and
a control unit coupled to the USB port, the first switch, the second switch, and the display unit, the control unit obtaining the type of the electronic device via the identification pin of the USB port, and outputting a control signal to the first switch and the second switch according to the obtained type of the electronic device;
wherein the first switch controls the first data pin coupled to one of the first voltage dividing units according to the control signal, and the second switch controls the second data pin coupled to one of the second voltage dividing units according to the control signal.

9. The charging device of claim 8, wherein the display unit comprises a touch screen.

* * * * *